Dec. 12, 1961     V. F. THORNE     3,012,663
AUTOMOBILE TIRE SHIPPING PACKAGE AND TIRE
RETAINING PALLET THEREFOR
Filed Nov. 2, 1959
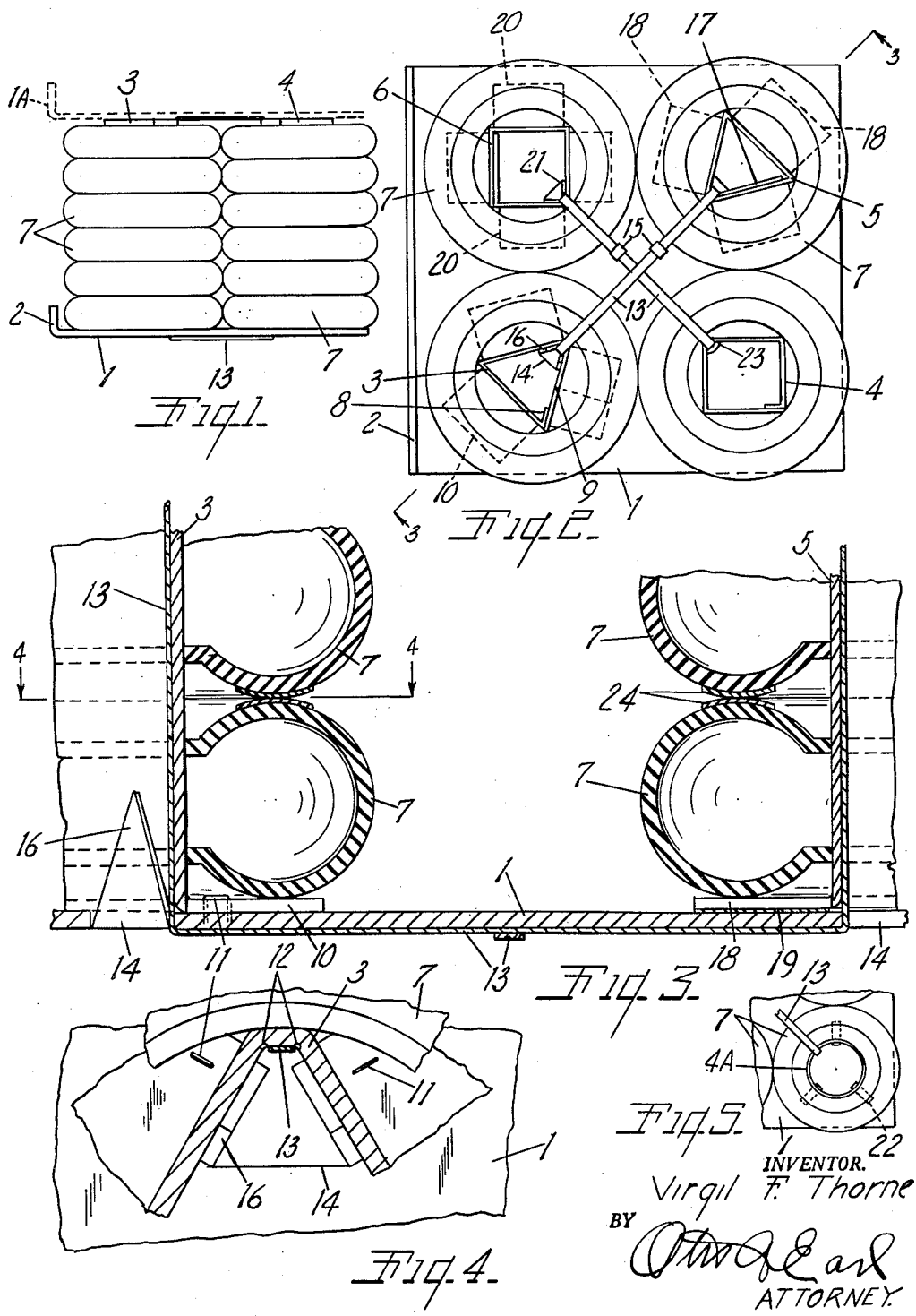
INVENTOR.
Virgil F. Thorne
BY
ATTORNEY.

… … …

United States Patent Office 3,012,663
Patented Dec. 12, 1961

3,012,663
AUTOMOBILE TIRE SHIPPING PACKAGE AND TIRE RETAINING PALLET THEREFOR
Virgil F. Thorne, 142 S. Prairie, Kalamazoo, Mich.
Filed Nov. 2, 1959, Ser. No. 850,240
10 Claims. (Cl. 206—65)

This invention relates to improvements in automobile tire shipping package and tire retaining pallet therefor. The principal objects of this invention are, First, to provide a package for shipping, storing and handling a plurality of automobile tires which will permit a plurality of tires to be handled as a unit with power operated machinery without damage to the tires.

Second, to provide a package for automobile tires which will retain a plurality of tires in a minimum of space with a minimum of packaging material.

Third, to provide a pallet and tire retaining structure which is simple and inexpensive and which can be shipped in flat condition and easily erected to tire retaining position.

Fourth, to provide collapsible pallet structure for packaging automobile tires which can be relatively inexpensively manufactured and handled either as a more or less permanent re-usable structure or as a single use disposable pallet of less permanent and less expensive material.

Fifth, to provide a pallet structure for storing and shipping automobile tires in which the weight and strength of the tires themselves co-operate with the retaining portions of the pallet in holding the package together and protecting the tires from damaging during shipment.

Other objects and advantages of this invention will be apparent from a consideration of the following description and claims. The drawings, of which there is one sheet, illustrate a highly practical form of the invention.

FIG. 1 is a side elevational view of a package of automobile tires assembled on a pallet according to the concept of the invention.

FIG. 2 is a top plan view of the package and pallet shown in FIG. 1.

FIG. 3 is a fragmentary vertical cross sectional view taken along the plane of the line 3—3 in FIG. 2.

FIG. 4 is a fragmentary horizontal cross sectional view taken along the plane of line 4—4 in FIG. 3.

FIG. 5 is a fragmentary plan of a modified form of package.

The torus shape of automobile tires renders them difficult to handle in multiple and it has been the general practice in the storage, shipping and handling of large quantities of tires to handle them individually. This individual handling is of course expensive and considerable trouble has been experienced by tire manufacturers with damage to tires having white side walls due to scuffing and scratching of the decorative surfaces during handling. The present invention provides a pallet which is easily loaded with a plurality of tires so that the tires can be handled as a unit and so that decorative side walls are fully protected.

The package of the invention and the pallet on which it is assembled consists of a flat rectangular panel 1 which may have a turned up edge 2 on one side to facilitate the entrance of the forks of a lift truck underneath the panel. The panel 1 may be made of any material of sufficient serength including metal mesh but in the example illustrated consists of heavy cardboard material known to the trade as "hardboard." When made of this paper material, it is economically feasible to discard the pallet after a single use.

The pallet 1 supports four hollow columns 3, 4, 5 and 6 located in rectangular position adjacent the corners of the panel. For the purpose of illustration four different types of columns are illustrated but it will be appreciated that in commercial use the four columns would probably be the same. It is a common characteristic of the four columns illustrated that they fit in retaining engagement within the inner rims of the tires 7.

The column 3 in the lower left corner of FIG. 2 is a triangular column having three side walls folded from a single blank of hardboard and a connecting flap 8 for joining the side walls in triangular shape. Where it is desired to pre-assemble the column 3 and ship it in flat knocked down form, one of the side walls 3 can be scored and folded along its mid section as at 9. The lower ends of the side walls of the column 3 have outwardly folded retaining flaps 10 thereon which rest upon the bottom panel 1 and are retained there against by the weight of the tires. For the purpose of temporarily holding the columns upright on the base panel when the pallet is erected, staples 11 can be driven through the flaps and the base panel. The column 3 being formed of relatively heavy hardboard actually has corner folds of substantial width formed by double score lines at 12 and the column is positioned on the platform with one angle facing diagonally across the panel toward the opposite column. After the tires 7 have been stacked on the columns, a steel packaging band 13 is passed through both hollow columns and through holes 14 provided therefor in the bottom panel and then across the space between the tops of hte two columns where it is drawn tight and connected by a conventional banding clamp 15. The banding strands 13 from the opposite pairs of columns cross at the top and the bottom of the assembled package. The hole 14 associated with the column 3 is formed by slitting the panel 1 and folding up triangular ears 16 which thus form locaters for positioning the column 3 on the panel 1.

The other types of columns illustrated at 4, 5 and 6 function in essentially the same way so far as retaining the tires on the pallet is concerned. They vary in structural details which will be pointed out. The column 5 is of triangular cross section similar to column 3 but has four walls, one folded inside of another as at 17 instead of the short connecting flap 8 of column 3. It is practical to ship column 5 entirely in the flat. Three retaining flaps 18 project from the lower edges of the side walls of the column 5 and may be initially secured to the bottom panel 1 by adhesive as indicated at 19 in FIG. 3. The hole 14 through which banding strap 13 passes into the column 5, is simply punched out of the panel 1 coextensive with the bottom of column 5. Columns 4 and 6 are essentially the same as column 3 except that they are rectangular instead of triangular in cross section. Side walls of the rectangular column 6 are provided with retaining flaps 20 which can rest freely on the bottom panel 1 or be secured thereto by either of the methods previously described. Retaining ears 21 struck upwardly from the panel 1 are provided for locating the column on the bottom panel. Column 4 has no retaining ears.

Column 4A in FIG. 5 is a circular tubular column which may be of disposable paper hardboard or metal as desired. Due to the circular contour of the column, it is more practical to provide separate retaining ears 22 attached to the bottom of the column and resting on the panel 1 in place of the integral flaps 10, 18 and 20 of the other columns. The opening through which the banding strip 13 passes is a circular hole 23 punched in the bottom panel in the desired position.

It is pointed out that the columns on the bottom panel, whichever cross sectional shapes are selected, will be positioned and spaced so that the tires in the four piles will have their outer surfaces or treads held against each other by the tension of the bands 13. Further the treads of the tires will be faced outwardly on all four sides of the package and by their very nature the treads of the tires are adapted to withstand any abrasion or bumping they may be subjected to during shipment or handling. The outer peripheries or treads of the tires may project slightly beyond the edges of the bottom panel 1 and thus protect the panel itself. When shipping tires have white or decorative walls, these walls which occur on one side only of each tire, can be packed face to face in a similar wall on an adjacent tire as at 24 in FIG. 3 so that the decorative side walls are fully protected against rubbing against the black rubber of other tires or any obstruction encountered in the handling of the package.

The upper ends of the columns 3, 4, 5 and 6 project to above or approximately level with the upper tires 7 and thus form posts upon which a second superimposed pallet 1A may be supported in storage or shipment. The columns support the vertical load and the tires thus reinforce the columns laterally against buckling so that a very strong and stable package is provided. It will be appreciated that the shape and contour of the tires 7 and their cross section have been conventionally illustrated and that the hollow tires will undoubtedly collapse to flattened shape in actual practice but the disclosure illustrates the manner in which the pallet and tires cooperate in the assembled package.

What is claimed as new is:

1. A package comprising a plurality of automobile tires supported in four rectangularly arranged piles with their peripheries touching and including a bottom panel supporting said piles, hollow columns of polygonal cross section positioned in retaining engagement within said piles of tires, said columns being formed of folded hardboard panels, part of said panels having retaining flaps extending outwardly from their lower ends and retained between said bottom panel and the bottom tires in said piles, means securing said retaining flaps to said bottom panel, and retaining metal bands passed in loops through diagonally opposite piles of tires and through holes provided for the bands in the bottom panel across the underside of the bottom panel to hold said piles together, the holes for said retaining bands being formed in part by ears folded upwardly from the bottom panel in retaining engagement with the lower ends of part of said columns.

2. A package comprising a plurality of automobile tires supported in four rectangularly arranged piles with their peripheries touching and including a bottom panel supporting said piles, hollow columns of polygonal cross section positioned in retaining engagement within said piles of tires, said columns being formed of folded hardboard panels, part of said panels having retaining flaps extending outwardly from their lower ends and retained between said bottom panel and the bottom tires in said piles, and retaining bands passed through diagonally opposite piles of tires and through holes provided for the bands in the bottom panel across the underside of the bottom panel to hold said piles together, the holes for said retaining bands being formed in part by ears folded upwardly from the bottom panel in retaining engagement with the lower ends of part of said columns.

3. A package comprising a plurality of automobile tires supported in plural piles with their peripheries touching and including a bottom panel supporting said piles, hollow columns of polygonal cross section positioned in retaining engagement within said piles of tires, said columns being formed of folded hardboard panels, part of said panels having retaining flaps extending outwardly from their lower ends and retained between said bottom panel and the bottom tires in said piles, and retaining bands passed through pairs of piles of tires and through holes provided for the bands in the bottom panel across the underside of the bottom panel to hold said piles together.

4. A package comprising a plurality of automobile tires supported in four rectangularly arranged piles with their peripheries touching and including a bottom panel supporting said piles, hollow columns of polygonal cross section positioned in retaining engagement within said piles of tires, said columns being formed of folded hardboard panels, means securing said columns to said bottom panel, and retaining metal bands passed in loops through diagonally opposite piles of tires and through holes provided for the bands in the bottom panel across the underside of the bottom panel to hold said piles together, the holes for said retaining bands being formed in part by ears folded upwardly from the bottom panel in retaining engagement with the lower ends of part of said columns.

5. A package comprising a plurality of automobile tires supported in four rectangularly arranged piles with their peripheries touching and including a bottom panel supporting said piles, hollow columns of polygonal cross section positioned in retaining engagement within said piles of tires, said columns being formed of folded hardboard panels, and retaining metal bands passed in loops through diagonally opposite piles of tires and through holes provided for the bands in the bottom panel across the underside of the bottom panel to hold said piles together.

6. A package comprising a plurality of automobile tires supported in plural piles with their peripheries touching and including a bottom panel supporting said piles, hollow columns of polygonal cross section positioned in retaining engagement within said piles of tires, said columns being formed of folded hardboard panels, and retaining metal bands passed in loops through pairs of tires and through holes provided for the bands in the bottom panel across the underside of the bottom panel to hold said piles together, the holes for said retaining bands being formed in part by ears folded upwardly from the bottom panel in retaining engagement with the lower ends of part of said columns.

7. A package comprising a plurality of tires supported in a plurality of piles, a bottom panel supporting said piles, hollow columns supported on said panel and positioned in lateral retaining engagement within said piles, said columns being formed of stiff vertical load supporting material with vertical walls foldable to flat position when separated from said panel and said piles, and retaining elements passed in loops through pairs of said piles and the columns therein to holes provided therefor in said panel and across the bottom of the panel.

8. A package comprising a plurality of tires supported in a plurality of piles, a bottom panel supporting said piles, hollow columns supported on said panel and positioned in lateral retaining engagement within said piles, said columns being formed of stiff vertical load supporting material and retaining elements passed in loops through pairs of said piles and the columns therein to holes provided therefor in said panel and across the bottom of the panel.

9. A package comprising a plurality of tires arranged in a plurality of piles, each pile having its periphery laterally supported from two directions by two adjacent piles, retaining elements passed in loops through pairs of said piles in retaining relation to the adjacent inner sides of the piles, means laterally stiffening the reaches of said elements within said piles, and skid means positioned in flat supporting engagement with the bottoms of said piles and secured thereto by said retaining elements.

10. A package comprising a plurality of tires arranged in a plurality of piles, each pile having its periphery laterally supported from two directions by two adjacent piles, retaining elements passed in loops through pairs of said piles in retaining relation to the adjacent inner sides of the piles, and skid means positioned in flat supporting engagement with the bottoms of said piles and secured thereto by said retaining elements.

References Cited in the file of this patent

UNITED STATES PATENTS

| 1,442,594 | Allen | Jan. 16, 1923 |
| 2,691,500 | Baumann | Oct. 12, 1954 |
| 2,888,221 | Connelly | May 26, 1959 |
| 2,925,978 | Marso | Feb. 23, 1960 |